3,317,424
DEMINERALIZATION OF POLAR LIQUIDS, ESPECIALLY WATER
Kenneth A. Schmidt, Chicago Ridge, Ill., assignor to Nalco Chemical Company, Chicago, Ill., a corporation of Delaware
No Drawing. Filed Mar. 1, 1963, Ser. No. 262,244
8 Claims. (Cl. 210—24)

This invention, in general, relates to the demineralization of water or other polar liquid with iron exchange resins, one of which is a cation exchange resin in the hydrogen form and the other of which is an anion exchange resin in the sulfate form. The two types of resins may be contacted with the raw water or other polar liquid sequentially in separate resin beds or advantageously, in a mixed bed containing a resin in the hydrogen form and another resin in the sulfate form.

Under present practice, the most common method for demineralizing water with ion exchange resins involves the employment of cation exchange resin in the hydrogen form and an anion exchange resin in the hydroxide form. The hydrogen ions of the cation resin are exchanged with the metal cations in the raw water, primarily sodium, magnesium and calcium, while the anions in the raw water are exchanged for the exchangeable hydroxide group of the anion exchange resin. The ultimate result of this dual resin treatment is the replacement in the water of the anions and cations by $H^+$ and $OH^-$.

This invention proposes the substitution of anion exchange resins in the sulfate form for the anion exchange resins in the hydroxide form of the prior art. The resultant ion exchange system has several distinct advantages over the prior art hydrogen-hydroxide system. First, in the hydrogen-hydroxide ion exchange resin system, two regenerants are required in order to regenerate the ion exchange resins to hydrogen and hydroxide forms. The cation exchange resin is regenerated with an acid, while the anion exchange resin is regenerated with a base. The regenerant base solution must be kept from contacting the cation exchange resin in order to prevent the cation of the base, e.g., potassium or sodium ion, from replacing the hydrogen ion of the regenerated cation exchange resin. Conversely, the regenerant aqueous acid must be kept from contacting the anion exchange resin so that the anion of the aqueous acid, e.g., sulfate or chloride, does not replace the hydroxide groups of the anion exchange resin.

In applicant's hydrogen-cation-sulfate anion exchange resin system, only one regenerant may be used to regenerate the exhausted resins to the hydrogen and sulfate forms. This regenerant may be spent or fresh aqueous sulfuric acid, the cation of which regenerates the cation resin to the hydrogen form and the anion of which regenerates the anion resin to the bisulfate form. The bisulfate form can then be converted to the sulfate form by rinsing with low solids, raw water or with demineralized water. In accordance with a special feature of the invention, the conversion of the anion exchange resin from the bisulfate form to the sulfate form may be accelerated by the incorporation into the rinse water of a small amount of a base, such as sodium hydroxide, sodium carbonate, or, preferably, aqueous ammonia.

In a mixed resin bed system, sulfuric acid as the regenerant is the most practical. However, where the cation resin and the anion resin are employed in separate beds, or are separated into upper and lower layers during regeneration (described hereinafter) the regenerant for the cation resin may be any economical acid, e.g., sulfuric acid or hydrochloric acid. The regenerant for the anion resin, in such case, may be sulfuric acid (fresh, spent, the effluent from the cation resin regeneration, etc.), raw water having a considerable sulfate content, or raw water supplemented with sulfate salt. In the case of sulfuric acid regeneration, the resin is thereafter converted from bisulfate to sulfate by water rinse or by aqueous alkali rinse to complete the regeneration.

Another advantage of the instant hydrogen form and sulfate form ion exchange resin system of the invention is that the ion exchange resin in sulfate form undergoes considerably less volume change in the conversion of the resin from the sulfate form to the chloride form, bisulfate form, bicarbonate form, etc., and vice versa, in the regeneration and exhaustion cycles than does the anion exchange resin in the conversion from the hydroxide form to the chloride, bisulfate, sulfate, bicarbonate, etc. form and vice versa. The larger alternating expansion and contraction of the anion exchange resin in the latter form considerably reduces the bed life of the ion exchange resin as a result of the weakening of the resin structure during the alternating expansion and contraction. Furthermore, in anion exchange apparatus, such as the Higgins reactor in which the anion exchange resin is relatively tightly packed in confined zones of the apparatus, i.e., the individual ion exchange, regenerant, and rinsing zones, the larger volume change of the hydroxide-type anion exchange resin creates greater pressures upon the resin beads when the resin expands, thereby further accelerating the degradation of the resin structure.

Still another advantage of the hydrogen form-sulfate form ion exchange resin system of the invention relates to the anion exchange system in which the anion exchange resin and the cation exchange resin are mixed together in a single bed through which the raw water is passed to yield demineralized water. The mixed bed system has advantages over the separate, sequential bed treatment, particularly in that the mixed bed system produces a better quality of deionized or demineralized water. A further significant advantage of the hydrogen-sulfate ion exchange resin systems of the invention is that the bed can be regenerated while retaining the two resins in admixture in view of the fact that aqueous sulfuric acid is the only chemical required for regeneration.

The foregoing advantages, as well as other improvements and advantages of the invention hereafter described, can be attained by practice of the invention in accordance with the following description thereof, a primary object of which is to provide a new and advantageous process for the demineralization or deionization of polar liquids, especially water.

Another object of the invention is to provide an ion exchange process for the demineralization or deionization of polar liquids, especially water, with an anion exchange resin in the sulfate form and a cation exchange resin in the hydrogen form.

Still another object of the invention is to provide processes for the removal of anions from polar liquids, especially water, with an anion exchange resin in the sulfate form.

A further object of the invention is to provide improvements in the regeneration of an anion exchange resin in the bisulfate form to the sulfate form by the employment of aqueous alkaline solution.

Another object of the invention is to provide, as a novel composition of matter, a physical mixture of particles of an anion exchange resin in the sulfate form and particles of a cation exchange resin in the hydrogen form, which physical mixture may be advantageously employed in the demineralization or deionization of water.

Still another object of the invention is to provide an ion exchange process utilizing ion exchange resins which may be regenerated with a single regenerant chemical; a more specific object being to provide an anion exchange resin system in which the anion exchange resin and the cation exchange resin are in the sulfate and the hydrogen forms, respectively, the exhausted resins being capable of regeneration to the sulfate and hydrogen forms with sulfuric acid and an aqueous rinse.

The ion exchange systems of the invention, like other ion exchange systems known in the art, are equilibrium systems both in the ion exchange or resin exhaustion phase of the process and in the regeneration phase of the process. This invention relates to equilibrium ion exchange systems utilizing ion exchange resins which are brought into contact with water or other polar liquid to be demineralized or deionized. The resin particles or beads may be slurried with the water or other polar liquid to be treated, although the more common procedure is to employ the resins in the form of beds through which the water or other polar liquid is passed and thereby brought into contact with the ion exchange resins.

The most predominant cations in raw waters, i.e., river water, lake water, well water, and the like, are sodium, calcium, and magnesium. In some instances, potassium and iron ions are also present in substantial amounts. The most commonly encountered anions in raw water are chloride, sulfate, bicarbonate and nitrate. These anions and cations, as well as any other anions or cations present in raw waters, can be effectively removed by hydrogen form and sulfate form ion exchange resins having salt splitting properties.

Briefly, the anion exchange resins used in the practice of the invention are strongly basic anion exchange resins, i.e., anion exchange resins which in the hydroxide form are capable of converting inorganic salts in aqueous solution directly to hydroxides. Thus, a strongly basic anion exchange resin is capable of converting an aqueous solution of sodium chloride directly to an aqueous solution of sodium hydroxide. A strongly basic anion exchange resin can also be defined as one which on titration with hydrochloric acid in water free from electrolytes has a pH above 7.0 when the amount of hydrochloric acid added is one-half of that required to reach the inflection point (equivalence point). A weakly basic anion exchange resin under the same conditions has a pH below 7.0 when one-half of the acid required to reach the equivalence point has been added. The strongly basic anion exchange resins which are available commercially are characterized by the fact that the exchangeable anion is a part of a quaternary ammonium group. The quaternary ammonium group has the general structure:

$$-\underset{+}{\overset{R_1\ \ R_2}{\underset{\diagdown}{N}}}\overset{}{\underset{X^-}{-R_3}}$$

wherein $R_1$, $R_2$ and $R_3$ represent alkyl or substituted alkyl groups, and $X^-$ is a monovalent anion.

Examples of the strongly basic anion exchange resins which can be employed in the practice of the invention are those resins disclosed in U.S. Patents, 2,591,573, 2,597,440, 2,597,494, 2,614,099, 2,630,427, 2,632,000 and 2,632,001.

The strongly basic insoluble anion exchange resins which are preferably employed for the purpose of the invention are reaction products of a tertiary alkyl amine and a vinyl aromatic resin having halo methyl groups attached to aromatic nuclei in the resin and subsequently converted to the sulfate. Another class of strongly basic anion exchange resins suitable for the practice of the invention are the reaction products of tertiary carbocyclic or heterocyclic amines and vinyl aromatic resins having halo methyl groups attached to aromatic nuclei in the resin and subsequently converted to the sulfate.

The vinyl aromatic resins employed as starting materials in making the anion exchange resins employed in the preferred practice of the invention are the normally solid benzene-insoluble copolymers of a monovinyl aromatic compound and a polyvinyl aromatic compound containing from 0.5 to 40% by weight, preferably from 0.5 to 2.0% by weight of the polyvinyl aromatic compound, chemically combined with 99.5% to 60% by weight of the monovinyl aromatic compound. Examples of suitable monovinyl aromatic compounds are styrene, alpha methyl styrene, chlorostyrenes, vinyl toluene, vinyl naphthalene, and homologues thereof, capable of polymerizing as disclosed, for example, in U.S. Patent 2,614,099. Examples of suitable polyvinyl aromatic compounds are divinyl benzene, divinyl toluene, divinyl xylene, divinyl naphthalene and divinyl ethyl benzene. These resins are halo methylated as described, for instance, in U.S. Patent 2,614,099, preferably to introduce an average of 0.2 to 1.5 halo methyl groups per aromatic nucleus in the copolymer and then reacted with a tertiary amine to introduce a quaternary ammonium anion exchange group. Examples of suitable tertiary amines are trimethyl amine, triethyl amine, tributyl amine, dimethyl propanol amine, dimethyl ethanol amine, methyl diethanolamine, 1-methylamino-2,3-propane diol, dioctyl ethanolamine, and homologues thereof.

The anion exchange resins can also be prepared by halogenating the molecule of the resin and then introducing an anion exchange group as described in U.S. Patent 2,632,000, and subsequently converting them to the sulfate, with or without admixture with the hydroxide form of the resin.

The preferred anion exchange resins used as starting materials in practicing the invention are Nalcite SAR and Nalcite SBR. The Nalcite SBR is a styrene-divinylbenzene resin containing quaternary amine ion exchange groups in which the three R groups are methyl groups. This resin consists of spherical particles of 20 to 50 mesh and containing about 40% water. The divinylbenzene content is approximately 7.5%. The total exchange capacity is approximately 1.2 equivalents per liter, wet volume. The Nalcite SAR is similar to the Nalcite SBR except that one of the methyl groups in the quaternary amine salt structure is replaced by a hydroxy ethyl group. The Nalcite SBR is somewhat more basic than the Nalcite SAR.

The cation exchange resin provides exchangeable hydrogen ions. Resins of this nature are known in the prior art, one of the most common types thereof being a sulfonated resin. Nalcite HCR-W is a sulfonated styrene divinyl benzene strongly acid cation exchanger of the type described in U.S. Patent 2,366,007.

Another suitable type of hydrogen form cation exchange resin is a sulfonic acid phenol-formaldehyde resin such as a resin derived by condensing a phenol sulfonic acid with formaldehyde. In general, resins having a plurality of sulfonic acid groups are the most suitable cation exchange resins for purposes of this invention.

WATER DEMINERALIZATION

Briefly, the equilibrium ion exchange systems of the invention are exemplified by the following equations for demineralization of water or other polar liquid containing, by way of example, sodium, calcium and magnesium cations and chloride, sulfate, bicarbonate and nitrate anions. R represents the resins. The longer arrow indicates the predominant reaction in the equilibrium systems.

*Demineralization equations*

Cations:

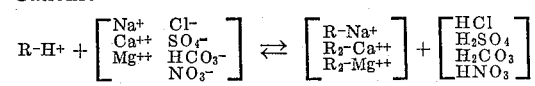

The carbonic acid may decompose in total or in part into water and carbon dioxide gas after it is formed.

Anion:

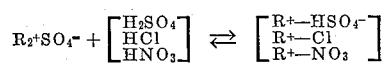

The reaction at an exchange site of the sulfate form anion exchange resin is fostered by the acidity of the aqueous media to convert one exchange site occupied by sulfate ion to bisulfate and sorb an anion in the aqueous phase on the other site. This may be illustrated, as follows, where H+X− is the acid in the aqueous phase and X− is its anion.

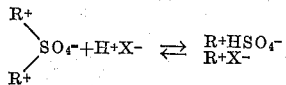

In demineralization of water, X− is predominantly one or more of Cl−, $HSO_4^-$, $NO_3^-$, and $HCO_3^-$.

When the three strong acids, hydrochloric acid, sulfuric acid, and nitric acid, produced as the effluent from the cation exchange resin, are passed downwardly for example, through a bed of such anion exchange resin, the top portion of the bed will be predominantly in the nitrate form, the mid-portion will be predominantly in the chloride form, and the lower portion of the bed will be predominantly in the bisulfate form.

The regeneration of the two resins with aqueous sulfuric acid, followed by a water rinse or an aqueous alkaline rinse may be exemplified by the following regeneration equations.

*Regeneration equations*

Cation:

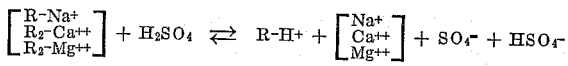

Anion:

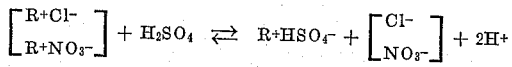

(a) Water rinse

(b) Aqueous alkaline rinse

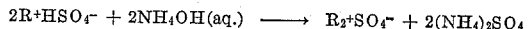

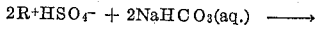
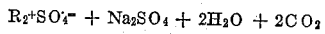

The following equation represents regeneration of the anion resin with aqueous sulfate salt solution.

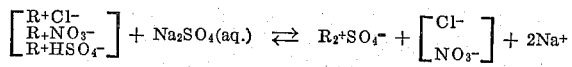

In a mixed bed, the volume ratio of cation exchange resin in the hydrogen form and anion exchange resin in the sulfate form may be in the range of about 6:1 to 1:6. The optimum ratio for any given water will depend upon the chemical content of the water, i.e., its alkalinity, bicarbonate content, etc. The exact proportions can be worked out without difficulty for each specific water in order to obtain exhaustion of both resin forms at about the same time.

It has been discovered, in accordance with this invention, that raw water or other polar liquid or semi-polar liquid having relatively low ionized solids content to high ionized solids content can be demineralized or deionized at economical costs and with simple ion exchange and regeneration procedures. The hydrogen form cation exchange resin and the sulfate form anion exchange resin function with sufficient efficiency so as to remove 90% or more of the total ionized salts of raw waters. The process is a practical one for the demineralization of raw waters for municipal water treatment plants in providing water to be used for human consumption.

One of the chief advantages of the ion exchange system of the invention in the treatment of raw waters for municipal use is the low cost of the regenerants, i.e., sulfuric acid or raw water with or without sulfate salt supplement. Sulfuric acid is one of the most inexpensive manufactured chemicals available, whereas caustic soda, which is used in regenerating a strongly basic anion exchange resin to the hydroxide form or a weakly basic anion exchange resin to the free amine form, is much more expensive than is sulfuric acid.

A further aspect of the invention relates to the use of ion exchange systems of the invention for the production of a substantially completely demineralized or deionized water. Because the operation of an ion exchange system of the invention is more economical than a system employing an anion exchange resin in the hydroxide form, substantially totally demineralized or deionized water can be produced utilizing the ion exchange system of the invention for the first or primary ion removal, followed by an ion exchange treatment with an anion exchange resin in the hydroxide form to remove anions of acids generated by the cation resin treatment but not removed in the first or primary treatment. The latter provides a polishing function in the removal of residual anions not removed by the anion exchange resin in the sulfate form in the primary or first treatment. If salts, as contrasted with the free acids, are present in the first or primary treatment effluent the polishing is done with both a cation exchange resin in the hydrogen form and an anion exchange resin in the hydroxide form. The primary treatment-polishing treatment above described is economically advantageous in that the more expensively regenerated anion exchange resin in the hydroxide form has a considerably smaller ion removal load and thus does not need to be regenerated as often.

$H_2SO_4$ REGENERATION

The aqueous sulfuric acid regeneration of the cation exchange resin to the hydrogen form is accomplished efficiently with sulfuric acid concentrations of about 1% or more, e.g., about 1% to 15% aqueous sulfuric acid, preferably about 2–10%.

The regenerant level, when defined on the total volume of mixed bed (and not on the cation fraction thereof) will vary (a) in proportion of cation to anion, and (b) in accordance with cation regeneration level needed. The following example illustrates the possible variations:

| Mixture | Acid Required, lbs. | |
|---|---|---|
| | Per C.F. Cation | Per C.F. Mixed Bed |
| 1C–1A | 5 | 2.5 |
| 1C–1A | 10 | 5.0 |
| 3C–1A | 10 | 7.5 |
| 1C–3A | 10 | 2.5 |

As an extreme regenerant level one could select a ratio of one cation to four anion and an acid dosage of three pounds of acid per cubic foot of cation, equivalent to a minimum of about 0.6 pound of acid per cubic foot of mixed bed. At the other extreme, one could select a ratio of four cation to one anion and a dosage of 15 pounds of sulfuric acid per cubic foot of cation, or 12 pounds of acid per cubic foot of mixed bed.

The preferred amount of acid should be based on a mixture containing equivalent capacity ratios of about 1 volume cation (21 kilograins per cubic foot capacity) to 1.5 volumes of anion (14 kilograins per cubic foot in the sulfate cycle) and an acid level of 4 pounds to 8 pounds per cubic foot of cation resin, equivalent to a *mixed* bed regeneration level of 1.6–3.2 pounds per cubic foot.

Acids other than sulfuric acid, e.g., aqueous hydrochloric acid, can be used to regenerate the cation exchange resin to the hydrogen form, especially when the cation exchange resin is employed in a bed separate from the anion exchange resin bed or is otherwise separated from the anion exchange resin during regeneration. However, as a practical matter, sulfuric acid regeneration of the cation exchange resin is ordinarily the most advantageous in view of the low cost of sulfuric acid and also the dual function afforded by sulfuric acid in also providing the bisulfate anion for regeneration of the anion exchange resin.

In a mixed bed consisting of a strongly basic anion exchange resin and a strongly acid cation exchange resin regeneration with sulfuric acid is by far the most expedient regeneration process. The mixed resin bed comprises relatively uniformly dispersed beads or particles of the two resins in physical admixture. As in the conventional methods of regeneration, the $H_2SO_4$ will displace the sorbed cations contained on the exhausted cation resin, providing on their ion exchange sites the cation $H^+$. In like manner, however, and occurring simultaneously in a mixed bed, the anions sorbed by the anion resin will be displaced by $HSO_4^-$ from the regenerant solution. After complete regeneration, the cation resin will be in the $H^+$ form; the anion resin will be in the $HSO_4^-$ form. Upon rinsing the anion resin with water or aqueous alkali, the $HSO_4^-$ will dissociate to $SO_4^=$ (which will be held by the anion resin). The eluted $H^+$ and eluted $HSO_4^-$ will form $H_2SO_4$ or a sulfate salt in the case of alkali rinse. The $H_2SO_4$ generated by the anion resin upon water rinse offers no detrimental effect to the system and will be flushed free of the bed or will be neutralized by the alkali.

RINSING TO CONVERT BISULFATE TO SULFATE

In the field of water treatment, as opposed to the field of chemical processing, demineralized water is not economically practical as the rinsing liquid for converting the anion exchange resin in the bisulfate form to the sulfate form. As a practical matter, the only water available as the rinse water in the area of water treatment is the raw water itself. This does not pose too great a problem with low total dissolved solids raw water when the ion exchange system is one employing the anion exchange resin and the cation exchange resin in separate beds, because the former can be rinsed independently with low total dissolved solids raw water for the conversion of the bisulfate to the sulfate.

In rinsing a mixed bed with raw water to accomplish the anion regeneration from bisulfate to sulfate, however, the cation exchange resin would be experiencing, during regeneration, exhaustion due to the metal cations of dissolved salts contained in the raw water. To eliminate this problem, a separate rinse of both resins may be employed.

The separate rinse procedure follows the regeneration of the mixed anion and cation exchange resins. The mixed resin bed is then backwashed at a sufficient velocity to agitate the bed. Under sufficient agitation the more dense cation exchange resin particles or beads will separate and settle in the bottom zone of the bed, while the less dense anion exchange particles or beads will be located in the upper portion of the bed. The rinse water, i.e., raw water can then be flowed downwardly through the anion exchange resin in the upper portion of the bed and tapped off at the approximate dividing line between the upper and lower resin layers so that it does not flow in any substantial degree into the lower portion of the bed containing cation resin. Simultaneously, a small amount of rinse water can be flowed upwardly through the lower portion of the bed to rinse out sulfuric acid regenerant in the lower portion of the bed. For further details as to the general technique, see U.S. Patent No. 2,771,424.

After a sufficient amount of rinse water is flowed through the upper portion of the bed containing the anion exchange resin to convert the latter from the bisulfate to the sulfate form, the bed can then be blown from the bottom portion thereof with air having a velocity sufficient to remix the bed, in which condition it is again ready for the demineralization phase of the process.

ALKALI RINSE

The conversion of the anion exchange resin bisulfate to the sulfate form can be accelerated by using an alkaline rinse water. Alkaline compounds used as the make-up for alkaline rinse water are, in the order of preference, ammonium hydroxide (aqueous ammonia), sodium bicarbonate and sodium hydroxide. Potassium bicarbonate or potassium hydroxide may also be used, although the latter are usually more expensive than the corresponding sodium compounds.

The total amount of alkali in the rinse water is related stoichiometrically to the amount of hydrogen ion eluted into the rinse water by the conversion

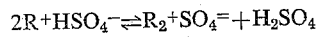

$$2R^+HSO_4^- \rightleftharpoons R_2^+SO_4^= + H_2SO_4$$

The total quantity of alkali is best kept close to the stoichiometric amount required to neutralize the eluted hydrogen ion. Furthermore, the anion exchange resin is best rinsed as a slurry in both sodium hydroxide solution and in sodium bicarbonate solution because the anions of these solutions have sufficient dissociation so that they tend to displace the newly regenerated sulfate groups on the resin if it is rinsed by flowing the alkali rinse water through the bed. For example, if aqueous sodium hydroxide solution were flowed downwardly through a cation resin bed in the bisulfate form, the newly regenerated sulfate groups in the upper portion of the bed would be converted in a substantial proportion to hydroxide groups by the sodium hydroxide. Aqueous ammonia, on the other hand, has little tendency to displace the sulfate groups and can be used in a bed rinse.

Accordingly, among the aqueous alkali rinse solutions, aqueous ammonia is the most efficient because its hydroxide ions have the least tendency to be consumed in the side reaction of displacement of sulfate groups on the resin with hydroxide groups. Therefore, the total amount of ammonia used in the rinse may be about the stoichiometric equivalent of the eluted hydrogen ion, or a slight excess, e.g., up to about 110% of the stoichiometric equivalent. With aqueous sodium hydroxide or aqueous sodium bicarbonate rinse solutions, on the other hand, the excess needed for complete neutralization of eluted hydrogen ion may be greater due to consumption of part of the base by the aforesaid side reaction. For this reason, the total amount of sodium hydroxide or sodium bicarbonate required to effect complete neutralization of the eluted hydrogen ion may be as high as about 125% of the stoichiometric equivalent.

It is contemplated that in some cases it may be to advantage to use a starvation amount of alkali, i.e., less than the stoichiometric equivalent, in order to minimize the aforesaid side reaction. In such case, starvation amounts of any of the aforementioned alkali compounds as low as 50% of the stoichoimetric equivalent may be used. Therefore, with an aqueous alkali rinse wherein sodium hydroxide or sodium bicarbonate is the alkali compound, the total amount of alkali component in the rinse water may be 50–125% of the stoichiometric equivalent to the amount of eluted hydrogen ion. With an aqueous ammonia rinse, the percentage range is 50–110% of the stoichiometric equivalent. The concentration of the aforesaid alkali compounds in the rinse water is not of crucial importance and may range from a few parts per million, e.g., 5 p.p.m., up to about 5%.

RAW WATER REGENERATION OF ANION EXCHANGE RESIN

Another technique for regenerating the exhausted anion exchange resin is to utilize raw water which has a sulfate anion content of at least one p.p.m. or to use raw water supplemented by the addition of a sulfate salt, e.g., sodium sulfate, as the regenerant solution. Inasmuch as the anion exchange resin has a preference for sulfate anion over chloride, nitrate or bisulfate anion, the sulfate anion of the raw rinse water will push off from the resin the other anions. This regenerant equilibrium system is illustrated in the following equation in which the sulfate salt in the raw water is sodium sulfate.

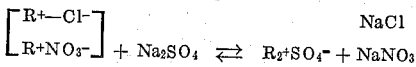

$$\text{NaCl}$$
$$+ \text{Na}_2\text{SO}_4 \rightleftarrows \text{R}_2^+\text{SO}_4^= + \text{NaNO}_3$$

The concentration of the sulfate anion in the raw water rinse, either the natural concentration or the concentration resulting from the supplement of the raw water with the sulfate salt, should be in the range of 10 to 100,000 p.p.m., preferably 50–5000 p.p.m.

It will be appreciated that the raw water regeneration technique will have an adverse effect upon the cation exchange resin in the hydrogen form inasmuch as the cations in the raw water regenerant will displace hydrogent ions on the cation resin. Accordingly, the raw water regeneration technique should be used when the anion resin and the cation resin are maintained in separate beds and can be regenerated separately or, in the case of mixed beds, when the resins are separated into layers by backwashing for the regeneration step by the procedure described above. In the latter case, the raw water regenerant can be flowed downwardly through the upper, anion exchange resin layer of the backwashed bed while the acid regenerant is flowed upwardly through the lower, cation exchange resin layer. Both the raw water regenerant and the acid regenerant are discharged from the vessel containing the resins at the approximate dividing line between the upper and lower resin layers.

The invention described heretofore is further illustrated in the following examples of the invention.

Example I

A water having the following analysis, expressed as $CaCO_3$: Ca, 23.6 grains per gallon; Mg, 14.8 g.p.g.; Na, 11.1 g.p.g.; Cl, 21.8 g.p.g.; $SO_4$, 20.0 g.p.g.; and $HCO_3$, 7.7 g.p.g., or a total dissolved solids of 846 p.p.m. (pH 7.6) was demineralized in a two-bed ion exchange system. The first bed contained Nalcite HCR–W resin, hydrogen form, in the form of 20–50 mesh beads. The second bed contained Nalcite SBR anion exchange resin, sulfate form, 50–100 mesh beads. The method of operation during all runs was identical, in that exhaustion flow rates, regeneration levels and regenerant concentrations, were kept constant. The following information was obtained on each test after the cation bed had been brought into cyclic equilibrium at the 4 lbs. regenerant level.

*Cation column data.*—Bed area of column, 0.00892 sq. ft. (1¼″) bed ht. of 700 ml. of resin, 35″; resin backwashed and settled vol., 0.026 cu. ft.

*Anion column data.*—Bed area of column, 0.0217 sq. ft.; bed ht. of 1750 ml. of resin, 35½; resin backwashed and settled vol., 0.0642 cu. ft.

*Exhaustion rate.*—5 gallons/min./sq. ft. of cation bed area.

*Cation regeneration level.*—4 lbs. of 93% $H_2SO_4$/cu. ft. of resin, applied as a 2% solution in test water.

*Average conductivity of demineralized water produced.*—80–90 micromhos.

*Average effluent conductivity of cation column.*—5300–5400 micromhos.

*Cation capacity on 4 lbs./cu. ft. of 93% $H_2SO_4$.*—211 gallons/cu. ft.×49.5 g.p.g. load=10.45 kg./cu. ft.

*Anion capacity operating with raw water as regenerant.*—42 gallons/cu. ft.×41.8 FMA load=1.755 kg./cu. ft.

*Cation-anion resin requirements for simultaneous exhaustion.*—1:5.95 ratio.

Example II

The procedure of Example I was repeated with a water having the following analysis: Ca, 42.8 g.p.g.; Mg, 44.8 g.p.g.; Na, 25.3 g.p.g.; Cl, 1.0 g.p.g.; $SO_4$, 92.4 g.p.g.; and $HCO_3$, 19.5 g.p.g. the total dissolved solids in the water was 1.935 p.p.m. The water had a pH of 76. The pertinent data for this run is as follows:

*Average conductivity of demineralized water produced.*—≅200 micromhos.

*Average effluent conductivity of cation column.*—8600 micromhos.

*Cation capacity on 4 lbs./cu. ft. of 933% $H_2SO_4$.*—102 gallons/cu. ft.×112.9 g.p.g. load=11.5 kg.cu. ft.

*Anion capacity operating with raw water as regenerant.*—37 gallons/cu. ft.×93.4 g.p.g. FMA load=3.46 kg./cu. ft.

*Cation-anion resin requirements for simultaneous exhaustion.*—1:3.32 ratio.

Example III

The previous two examples relate to water having a relatively high total dissolved solids content. As a general proposition, the efficiency of the resins improves as the total dissolved solids of the water being demineralized increases. This example is concerned with the treatment of a low total dissolved solids water with the anion exchange system of the invention.

The ion exchange beds were the same as in Example I and II. With the cation bed fully regenerated, and with the anion bed fully regenerated by rinsing with the raw water of Example II, a 30 grain water, expressed as $CaCO_3$, was flowed to the beds under the conditions set forth in Example I. The 30 grain water analyzed: Ca and Mg, 32, 95 g.p.g.; Na, 0.05 g.p.g.; Cl, 15.8 g.p.g.; $SO_4$, 9.95 g.p.g.; and $HCO_3$, 7.25 g.p.g. (total dissolved solids, 564 p.p.m.).

The pertinent data was:

*Average conductivity of demineralized water produced.*—15 micromhos.

*Average effluent conductivity of cation column.*—3400 micromhos.

*Anion capacity operatiing with 1935 p.p.m. raw water as regenerant to an effluent conductivity breakthrough to 80 micromhos.*—76.2 gallons cu. ft.×25.75 g.p.g. FMA load=1.96 kg./cu. ft.

Both resins were regenerated once again in the same manner as before, i.e., the cation resin was fully regenerated with HCl; the anion resin was regenerated by rinsing the beds with test water No. 2 until a constant effluent conductivity was noted. Both beds were rinsed with D.I. water. Exhaustion was conducted with Chicago tap water. Results were:

*Average conductivity of demineralized water produced.*—16 micromhos.

*Average effluent conductivity of cation column.*—365–370 micromhos.

*Anion capacity operating with 1935 p.p.m. raw brackish water as regenerant to breakthrough conductivity of approx. 50 micromhos.*—292 gallons/ cu. ft.×2.75 g.p.g. FMA load=0.802 kg./cu. ft.

The performance of the resin system on low total dissolved solids waters may be improved by supplementing the raw water with $SO_4^=$, as for example, by the addition of a salt such as $Na_2SO_4$, or by simply utilizing the spent $H_2SO_4$ regenerant used in converting the anion bed to the $HSO_4^-$ form. With a low TDS water, an extensive rinse of the anion resin would be possible, if required, to convert the bed to the $SO_4^=$ form, with little or no exhaustion due to the $Cl^-$ and $HCO_3^-$ contained in natural raw water.

Example IV

In each of a series of tests, Nalcite SBR–P resin in the sulfate form was exhausted to about 54% of operating capacity to the bisulfate form with sulfuric acid. The resin was rinsed with only deionized water and also with aqueous ammonia and deionized water for comparison of the regeneration phase of the process in converting the resin from bisulfate to sulfate. The resin bed had a cross-sectional area of 0.0029 sq. ft., a height of 1.81 ft., and a volume of 0.00527 cu. ft. The bed in the partially exhausted form was first rinsed with 150 ml. of deionized water to rinse out sulfuric acid, after which 100 ml. of 1.19 N $NH_4OH$ was flowed through the bed. The bed was then rinsed with deionized water at a rate of 0.24 gal./min./sq. ft. of bed area to the desired endpoint, an effluent conductivity of 10 mmhos. This required about 500 ml. of deionized water.

On the other hand, when the bed was again partially exhausted to the same degree and thereafter rinsed with only deionized water, after 2750 ml. of water had flowed through the bed, the conductivity of the effluent was still about 35 mmhos. The change in conductivity of the bed at from 2500 ml. to 2750 ml. total deionized rinse water was only from about 45 mmhos. to about 35 mmhos., which is indicative that hundreds more ml. of rinse water would be required before the conductivity of the effluent became 10 mmhos.

It will be appreciated that the alkali rinse procedure, therefore, offers the advantage of requiring considerably less rinse water to convert strongly basic anion exchange resins from the bisulfate form to the sulfate form. This is advantageous when the rinse water is deionized water, due to the cost of the latter, and also when the rinse water is a raw water, preferably a low solids water, because the ion content of the latter tends to displace sulfate or bisulfate ions on the resin with other anions during the rinsing. Furthermore, the regeneration time is less due to the smaller amount of total rinse water required.

*Example V*

One hundred parts by volume of Nalcite SBR–P resin in the sulfate form was exhausted completely in a column to the bisulfate form with 1% sulfuric acid. The bed was drained of sulfuric acid solution and transferred to a vessel equipped with an agitator. Deionized water was added in an amount sufficient to allow the resin to be stirred. Sodium bicarbonate aqueous solution (1N) was added until the pH of the resin slurry was 6. The resin was transferred back to the column. Water used in transferring and mixing was about 400 parts by volume. An additional 250 parts by volume of deionized water were passed through the column to obtain an effluent conductivity of 5 mmhos.

When the resin bed was again fully exhausted as described above, it was rinsed only with deionized water. At a total rinse volume of 1500 parts by volume, the conductivity of the rinse effluent was still 23 mmhos.; at 3000 parts by volume, 10 mmhos., at 6000 parts by volume, 8 mmhos.; and at 10,000 parts by volume, 6 mmhos.

PHOSPHATE FORM

Instead of using an anion resin in the sulfate-bisulfate forms, the invention can be practiced also with the strongly basic anion exchange resin in the orthophosphate, hydrogen phosphate, and dihydrogen phosphate forms. For example, a strongly basic anion resin in the orthophosphate form can be used in a mixed bed or two-bed system in demineralization of water in accordance with the following equations:

*Demineralization:*

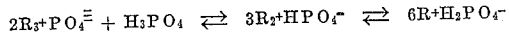

*Regeneration, phosphoric acid:*

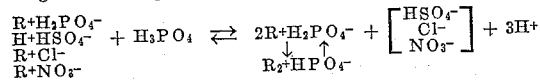

*Water rinse:*

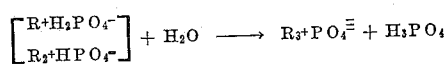

*Regeneration, phosphate:*

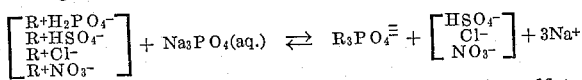

The phosphate form has an advantage over the sulfate form in that the phosphate anion has three dissociation stages instead of two, whereby a lesser mol equivalent of $PO_4^=$ is required to occupy the resin exchange sites than is the case with $SO_4^=$. On the other hand, however, phosphoric acid and phosphates are ordinarily considerably more expensive than sulfuric acid and sulfates, respectively, whereby the sulfate-bisulfate system in most circumstances will be the more economical to operate. In cases where this situation does not exist, the phosphate-type anion exchange system can be employed to advantage in the same manner as the sulfate-type anion exchange system. Phosphoric acid or a phosphate salt, e.g., sodium orthophosphate, may be substituted for sulfuric acid or sulfate salt, respectively, in any of the foregoing examples. The resin may be regenerated to the orthophosphate form with raw water containing orthophosphate salts or supplemented therewith or with fresh or spent phosphoric acid followed by a low solids water rinse with or without employing the alkali rinse step with aqueous solutions of alkali metal hydroxides or aqueous ammonia.

While the foregoing description has been related largely to demineralization of water to remove salts with chloride, nitrate, bicarbonate, carbonate, sulfate, bisulfate and/or like anions, the same techniques can be applied to demineralization or deionization or other polar liquids or semipolar liquids containing salts with these anions. Organc polar liquids and organic semipolar liquids containing such inorganic salts, e.g., ash-laden liquids behave in the ion exchange system herein described like the water containing such salts. The demineralization processes herein described are therefore operable in demineralization of water, mixtures of water and water-miscible organic liquids, polar organic liquids or semi-polar organic liquids. Water-soluble, polar and semi-polar solvents include: lower aliphatic alcohols such as ethyl, methyl, isopropyl; ketones such as acetone and dimethylketone; polyols such as glycerol and ethylene glycol; ethers such as diethyl ether, di-isopropyl ether, etc.

The demineralization of water by the processes of the invention are effective in removing the commonly occurring ions of waters of low total dissolved solids to high total dissolved solids, e.g., brackish waters containing 800–4000 p.p.m. total dissolved solids, to the degree that the latter waters are made potable or can be used for industrial purposes wherein the residual dissolved solids content is tolerable. An anion exchange resin ($OH^-$ form) and cation exchange resin ($H^+$ form) can be used as a follow-up or polishing treatment to remove residual ions, if desired. The efficiency of the anion exchange resin, i.e., percent of total inorganic salts removed, in the sulfate form increases as the inorganic salt content of the water increases without a parallel increase in the amount of resin required. The process is useful in demineralization of low inorganic salt-content water or high inorganic salt-content water, e.g., brackish waters. The invention is useful in demineralization of waters having a wide range in dissolved inorganic salt content, i.e., for low total dissolved solids water having upwardly from 10 or 15 p.p.m. total inorganic salts such as salts with sodium, potassium, magnesium, calcium and/or iron cations and chloride, bromide, iodide, bicarbonate, carbonate, sulfate and/or bisulfate anions and including brines and brackish waters in which the total content of said inorganic salts may be as high as 50,000 p.p.m. or even 100,000 p.p.m.

It will be appreciated from the foregoing description of the invention that the conversion of the anion exchange resin from the bisulfate form to the sulfate form can be accomplished by any one of several procedures. For example, in a mixed bed in which the anion and cation resins remain mixed, the mixed bed may be regenerated with sulfuric acid and may be then rinsed with deionized water or with low dissolved solids raw water which will not appreciably exhaust the cation exchange resin in the hydrogen form until the conversion is accomplished.

When the anion and cation resins are employed in separate beds or are separated in a mixed bed into upper and lower layers during regeneration, the regenerant may be dilute sulfuric acid passed through both layers, or the regenerants may be raw water with appreciable sulfate content (natural or supplemented) for the anion exchange resin and an aqueous solution of any strong acid, e.g., sulfuric acid, hydrochloric acid, etc., for the cation exchange resin. The cation exchange resin need be rinsed only with sufficient water to remove residual acid regenerant from the bed although more than this amount can be used without adverse effect if the water is deionized water or low dissolved solids raw water. The anion exchange may be rinsed of regenerant solution with the same water as is used to rinse the cation exchange resin, or it may be rinsed independently of the cation resin rinse. It will be appreciated that the conversion of the anion resin from bisulfate to sulfate with water alone requires considerably more water than is required to rinse out acid regenerant from the regenerated cation resin. Therefore, especially when the rinse water contains appreciable dissolved solids which would exhaust to an appreciable degree the regenerated cation resin, or when an alkali rinse is used in the bisulfate to sulfate conversion, separate rinses of the regenerated cation and anion exchange resins should be employed. The water rinsing of the cation exchange resin need only be an amount sufficient to wash out the residual acid regenerant. The rinsing of the anion exchange resin regenerated directly to the sulfate form by regeneration with aqueous sulfate salt solution need not be rinsed or may be rinsed to wash out sulfate salt solution if desired with its own rinse water or the water used to rinse the cation resin. The rinsing of the anion exchange resin regenerated by sulfuric acid, on the other hand, requires a larger amount of water, with or without the alkali rinse step, sufficient to convert the bisulfate form to sulfate form. With a mixed bed separated into anion resin or cation resin layers by backwashing, or in separately maintained cation and anion resin beds, both resins may be rinsed after sulfuric acid regeneration with the same rinse water in an amount sufficient to wash out the regenerant sulfuric acid, after which only the anion exchange resin is further rinsed with water alone or with the aqueous alkali supplement to convert the anion resin to the sulfate form.

Another aspect for rinsing techniques which can reduce cost of regeneration of the anion resin is to regenerate the resin bed by an upflow rinse with water alone or preferably with an alkali supplement. Taking, for example, the situation where the sorbed anions on the exhausted anion exchange resin are chloride, bicarbonate and bisulfate, chloride being most preferred by the resin of the three anions, will be located mostly in the upper portion of the bed; bicarbonate, in the middle portion of the bed, and bisulfate in the lower portion of the bed. As rinse water flows upwardly through the bottom portion of the bed, bisulfate is converted to sulfate with the generation of sulfuric acid. Very dilute sulfuric acid, in turn, tends to be sorbed by the resin as sulfate. The resin has greater selectivity or preference for sulfate than for bicarbonate or chloride, and the latter are displaced to some extent by sulfate. This technique will not regenerate completely the anion resin, but it may be used alone periodically or ahead of regeneration with sulfate salt solution regeneration to economize on regenerant chemical cost. The upflow rinse with aqueous alkali solution wherein the total alkali content is 50–125% of the stoichiometric equivalent of the hydrogen ions of the sulfuric acid generated by the bisulfate to sulfate conversion may be used to advantage in the upflow rinse technique to accelerate the rate of regeneration. The alkali and generated sulfuric acid react to provide a sulfate salt.

In demineralization processes employing the sulfate form anion exchange resin or the phosphate form anion exchange resin and the hydrogen form cation exchange resin for the primary demineralization, followed by a polishing step to remove residual anions with a hydroxide form anion exchange resin, the latter resin may be used alone in the polishing step if the cation exchange resin used in the primary demineralization produces an effluent which has essentially only hydrogen cations. However, where additional cation exchange is desired in the polishing step, a hydrogen form cation exchange resin may be used in a two-bed or mixed bed system along with the anion exchange resin in the hydroxide form.

The invention may be used in many situations, one of which is the demineralization of high dissolved solids water to make it potable. For example, one can treat economically a saline or hard natural water to reduce the inorganic salt content or alkali content to a potable level. The process can also be used by industrial plants, with or without the follow-up polishing treatment, to reduce inorganic salt content of its supply water to the level most suitable for the particular industrial use of the water. Also, many times it is desirable or required by law that waste water discharged by a plant into a stream or other body of water be below a certain salt level in order that the stream or other body of water is not adversely contaminated. In such cases, the invention can be employed to demineralize the waste water to a lower salt level before it is discharged into the stream or other water body.

The invention is hereby claimed as follows:

1. A process for the demineralization of water which comprises bringing water containing dissolved inorganic salts into contact with a cation exchange resin in the hydrogen form, and thereby exchanging the hydrogen ions of said cation exchange resin for the cations of said salts and forming the acids of the anions of said salts; and bringing the water containing said acids into contact with a strongly basic anion exchange resin in the sulfate form, and thereby sorbing the anions of said acids on said anion exchange resin by a chemical reaction including conversion of exchangeable sulfate groups on said resin to bisulfate groups.

2. A process for demineralization of water which comprises bringing into contact water containing inorganic salts with a bed of mixed particles of both a cation exchange resin in the hydrogen form and a strongly basic anion exchange resin in the sulfate form, and thereby exchanging the hydrogen ions of said cation exchange resin for the cations of said salts and forming the acids of the anions of said salts; and sorbing on said anion exchange resin the anions in said water by a chemical reaction including conversion of exchangeable sulfate groups on said resin into bisulfate groups.

3. A process for regenerating a bed of a cation exchange resin to the hydrogen form and another bed of strongly basic anion exchange resin to the sulfate form which comprises passing through one of said beds dilute sulfuric acid, passing the effluent from said last-mentioned bed through the other of said beds, whereby the anion exchange resin is converted to the bisulfate form and the cation exchange resin is converted to the hydrogen form, rinsing both resin beds with water, and converting the anion exchange resin to the sulfate form by contacting said resin with aqueous alkali in an amount of alkali equal to 50–125% of the stoichiometric equivalent of hydrogen ion released in converting said resin from the bisulfate form to the sulfate form.

4. In a process for regenerating an exhausted cation exchange resin to the hydrogen form and an exhausted anion exchange resin to the sulfate form wherein said exhausted resin particles have different densities and are mixed in a bed, the steps comprising backwashing said bed of exhausted resins with sufficient force to agitate the resin particles and allow the anion exchange resin particles and cation exchange resin particles to separate into upper and lower layers of the more dense and less dense particles, flowing dilute sulfuric acid regenerant solution through both layers, and flowing water through said layers in an amount sufficient to rinse out residual sulfuric acid regenerant and thereafter flowing additional water through only said layer containing said anion exchange resin in an amount sufficient to convert said anion exchange resin from the bisulfate form to the sulfate form.

5. A process as claimed in claim 4 wherein water is flowed through said layers in an amount sufficient to rinse out residual sulfuric acid regenerant and wherein said layer containing said anion exchange resin is rinsed with aqueous alkali solution.

6. A process for the demineralization of water which comprises bringing water containing dissolved inorganic salts into contact with a cation exchange resin in the hydrogen form, and thereby exchanging the hydrogen ions of said cation exchange resin for the cations of said salts and forming the acids of the anions of said salts; and bringing the water containing said acids into contact with a strongly basic anion exchange resin in the sulfate form, and thereby sorbing the anions of said acids on said anion exchange resin by a chemical reaction including conversion of exchangeable sulfate groups on said resin to bisulfate groups, regenerating the exhausted cation exchange resin with acid, and regenerating the exhausted anion exchange resin with raw water having sufficient sulfate content to regenerate said anion exchange resin to the sulfate form.

7. A process for demineralization of water which comprises bringing into contact water containing inorganic salts with both a cation exchange resin in the hydrogen form and a strongly basic anion exchange resin in the orthophosphate form, and thereby exchanging the hydrogen ions of said cation exchange resin for the cations of said salts and forming the acids of the anions of said salts and exchanging the anions on said anion exchange resin with the anions of said salts and also taking up on the anion exchange resin phosphoric acid generated in the process by converting exchangeable phosphate groups on said resin into hydrogen phosphate and dihydrogen phosphate groups.

8. A process for regenerating an exhausted bed of strongly basic anion exchange resin to the sulfate form which comprises rinsing said bed, the bottom portion of which is exhausted resin in the bisulfate form, with an upward flow of water which contains a small amount of alkali, thereby regenerating the resin in the bisulfate form to the sulfate form with the generation of sulfuric acid which is neutralized at least in part by said alkali, to alkali sulfate and further converting other portions of the exhausted bed into the sulfate form by the sulfate salt produced from said alkali and said generated sulfuric acid.

References Cited by the Examiner

UNITED STATES PATENTS

| | | | |
|---|---|---|---|
| 2,461,505 | 2/1949 | Daniel | 210—30 X |
| 2,561,695 | 7/1951 | Gustafson | 127—46 |
| 3,156,644 | 11/1964 | Kunin | 210—24 X |

MORRIS O. WOLK, *Primary Examiner.*

JOSEPH SCOVRONEK, *Examiner.*

E. G. WHITBY, *Assistant Examiner.*

UNITED STATES PATENT OFFICE
CERTIFICATE OF CORRECTION

Patent No. 3,317,424                                    May 2, 1967

Kenneth A. Schmidt

It is hereby certified that error appears in the above numbered patent requiring correction and that the said Letters Patent should read as corrected below.

Column 1, line 11, for "iron" read -- ion --; column 9, line 40, strike out "of"; column 9, line 71, for "the", first occurrence, read -- The --; line 72, for "1.935" read -- 1,935 --; same line 72, for "76" read -- 7.6 --; column 10, line 3, for "933%" read -- 93% --; column 12, line 2, for "$PO_4^{=}$" read -- $PO_4^{\equiv}$ --.

Signed and sealed this 16th day of July 1968.

(SEAL)
Attest:

Edward M. Fletcher, Jr.

Attesting Officer

EDWARD J. BRENNER

Commissioner of Patents